Oct. 24, 1933.    J. R. HARRISON    1,931,985
GRAIN MEASURING DEVICE
Filed March 31, 1928
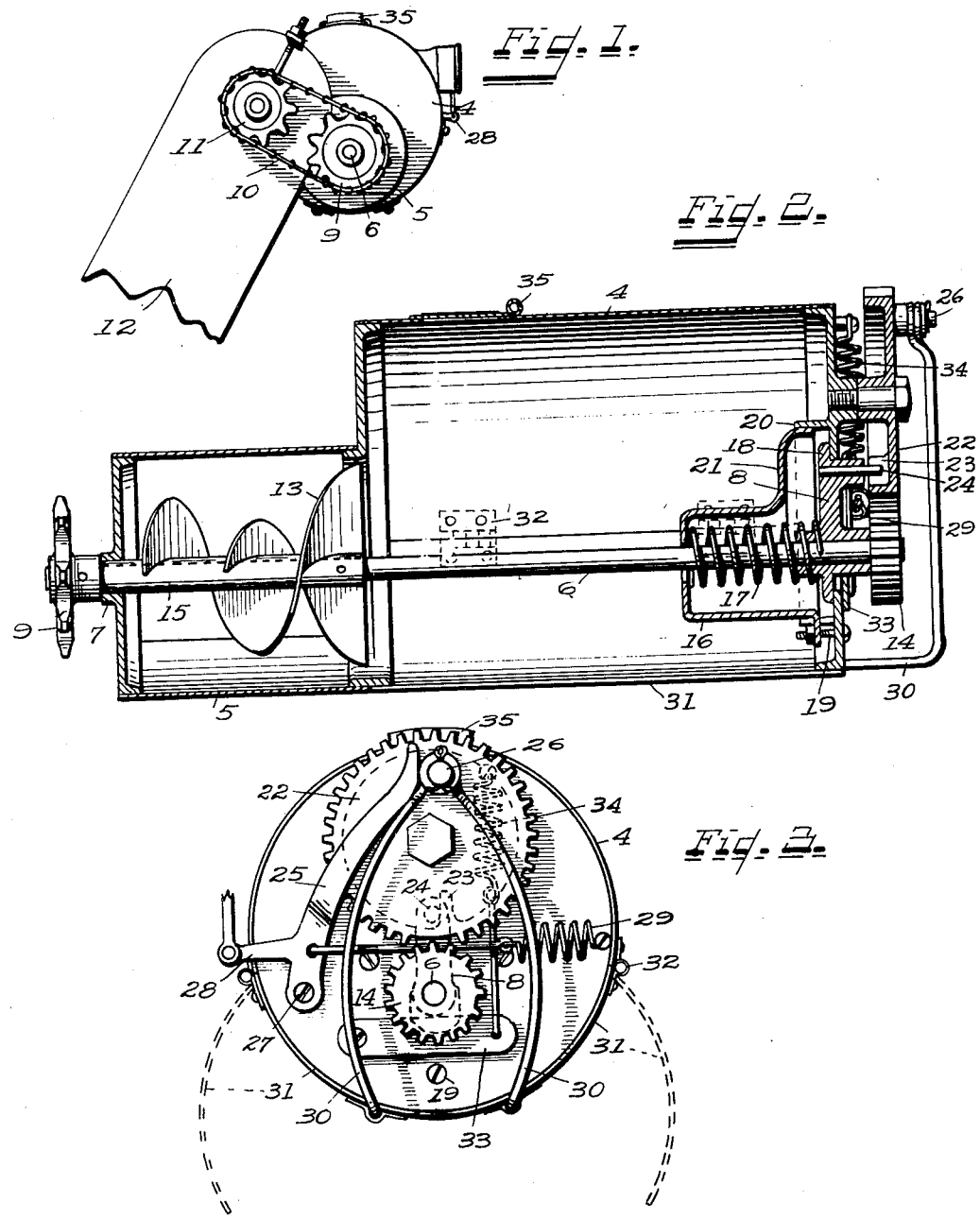
Inventor
James R. Harrison.

Patented Oct. 24, 1933

1,931,985

UNITED STATES PATENT OFFICE 1,931,985

GRAIN MEASURING DEVICE

James R. Harrison, Peoria, Ill.

Application March 31, 1928. Serial No. 266,360

6 Claims. (Cl. 73—131)

My invention relates more particularly to devices suitable for use on harvesting machinery, and more particularly to that class of harvesting machinery known as combines, in which the grain is cut and threshed and loaded into wagons while the machine is traveling across the field of grain.

On the ordinary type of threshing machine, where the machine is set up for operation, and the grain brought to it in sheaves or otherwise, it has been possible to use devices known as grain weighers for determining the amount of grain as it passes through the machine, but these weighers are of more or less delicate arrangement and will not operate properly if they are jolted and moved about as they would be if attached to a combine, whereas my machine will operate equally well whether it is on a machine which remains in one place or whether it is on a machine which is moved about while being operated.

One object of my invention is to provide a machine which comprises in part a measuring receptacle and is provided with means for positively filling the receptacle, the filling means acting to cause the dumping of the receptacle after it has been properly filled.

Another object of my invention is the provision of means whereby the grain may be packed into the measuring receptacle by the same mechanism which feeds the grain into the receptacle, and also the provision of means for regulating the amount of packing pressure applied to the grain to insure uniform filling of the measuring receptacle.

Another object of my invention is the provision of means for insuring the complete and rapid unloading of the measuring receptacle after it has been properly filled and the mechanism for unloading has been set in motion.

Other objects of my invention will appear and be described in the specification.

The novelty of my invention will be hereinafter more fully set forth and specifically pointed out in the claims.

In the accompanying drawing:

Fig. 1 is an end view of my measuring device, showing the same mounted on the upper end of a typical elevator such as is used on threshing machines and combines.

Fig. 2 is an enlarged central sectional side elevation of my machine.

Fig. 3 is an end view of the device showing the dumping or unloading mechanism and its associated parts.

The same numerals of reference are used to indicate identical parts in all the figures.

For purposes of illustration and as showing one form of construction embodying my invention, though without limiting myself to the details of construction and arrangement of parts shown and described herein, but availing myself of all changes and modifications which may be made, and which fall within the scope of the appended claims, I have shown a device comprising a measuring receptacle 4, a receiving portion 5, and the other parts to be now described.

The measuring receptacle 4 and the receiving portion 5 constitute the frame work of the machine, and it is to be noted that these parts are eccentrically arranged with relation to each other so that the bottom portion of each is at about the same level. A shaft 6 is mounted concentrically in the receiving portion 5 and projects through the measuring receptacle 4, this shaft has a bearing 7 in the end of the receiving portion and passes through a bearing 8 mounted for a slight vertical movement as well as longitudinal movement in the end of the measuring receptacle, this shaft 6 being provided with a sprocket 9 which is driven as shown in Fig. 1, by a chain 10 which also passes over a sprocket 11 carried by the head shaft of the elevator 12. The shaft 6 carries a spiral flight conveyor 13 which is mounted within the receiving portion 5, and a pinion 14 at its end opposite to that which carries the sprocket 9. The spiral flight conveyor 13 is preferably arranged on a tube 15 which is fastened to the shaft 6 and which passes through the bearing 7. The sprocket 9 has an extended hub which normally rests against the end of the bearing 7 and forms a movement limit to prevent the shaft 6 from moving to the right beyond the position shown in Fig. 2.

A housing 16 is mounted on the right end of the measuring receptacle 4 and surrounds a portion of the shaft 6, and a spring 17 lies within this housing and rests against the housing at one of its ends, the other end resting against the bearing 8, this spring normally exerting its pressure to force the bearing 8 to the right until its flanges 18 rest against the end of the measuring receptacle. The housing 16 may be adjustably connected to the end of the measuring receptacle as by bolts 19 so that its position may be changed to adjust the pressure exerted by the spring 17, there being preferably three of these bolts 19 equally spaced around the housing 16, though only one is shown in Fig. 2, the housing being centered by flanges 20 carried by the end of the measuring receptacle. To permit the bearing 8 to move to the left, as will be later described, the housing 16 is enlarged as at 21.

Referring to the right end of Fig. 2 and to Fig. 3, I will now describe the parts composing the unloading or dumping mechanism. A mutilated gear 22 is mounted on the end of the measuring receptacle 4 and carries a stop 23 which engages a pin 24 carried by the bearing 8, and in the position shown in Figs. 2 and 3, when the stop 23 engages the pin 24, the blank portion of the mutilated gear 22 is immediately above the pinion 14 so that there is no driving connection between it and the gear 22. Referring more particularly to Fig. 3, an arm 25 rests at its upper end, against a crank pin 26 carried by the mutilated gear 22, the lower end of this arm being pivoted as at 27 to the end of the measuring receptacle. This arm 25 carries a projection 28 to which any suitable registering mechanism may be connected for registering the amount of grain passing through the device. A spring 29 is attached to the end of the measuring receptacle and its other end is linked to the arm 25 to move the upper end of this arm to the right when viewed from the position of Fig. 3.

A pair of spring metal connecting rods 30 extend from the crank pin 26 each being connected to one of the doors 31 which form the lower portion of the measuring receptacle 4, these doors being hinged as at 32 and extending substantially the full length of the measuring receptacle. As previously stated the bearing 8 is arranged for a vertical movement this being accomplished by elongating the opening in the end of the measuring receptacle through which this bearing passes, the bearing being normally held in its upper position by a lever 33 pivoted at one end to the end of the measuring recepacle, the other end being linked to the spring 34 which exerts its pressure to raise the free end of the lever 33 to hold the bearing 8 in its highest position.

The arrangement is such that should the shaft 6 move either endwise or downward, the bearing 8 moves with it.

The receiving portion 5 is cut away at one side where the device is attached to the elevator so that the grain being discharged from the elevator can enter this portion of the machine, and assuming that the machine is attached as shown in Fig. 1, and that the elevator is bringing up grain to be measured, it and the shaft 6 being actuated, the operation of the machine is as follows:

The grain enters the receiving portion 5 and is forced by the conveyor 13 into the measuring receptacle 4, it being noted that the grain is forced into the measuring receptacle at the lower portion thereof. As the flow of grain continues, it is forced into the measuring receptacle and gradually rises until it has filled it to the top, at which time the conveyor 13 begins to pack the grain in the measuring receptacle until sufficient pressure is produced to force the conveyor 13 and the shaft 6 to the left when viewed from the position shown in Fig. 2, the bearing 8 beginning to compress the spring 17 to determine the amount of packing of the grain in the measuring receptacle 4 and as the operation continues, the pressure on the conveyor 13 increases until the conveyor and the shaft 6 have moved to the left a sufficient distance to move the pin 24 out of its engagement with the stop 23 carried by the mutilated gear 22, at which time the lever 25 moves the gear 22 to bring its teeth into mesh with the pinion 14 to accomplish the unloading operation, the gear 22 making one revolution, during the first half of which the doors 31 are swung to the dotted position of Fig. 3, thereby permitting all of the grain in the measuring receptacle to drop out, the second half revolution of the gear 22 closing the doors 31 to the full line position shown in Fig. 3. During the period when the doors 31 are open, the pressure in the measuring receptacle is of course released, and the shaft 6 is moved back to the position of Fig. 2 by the spring 17, thus bringing the pin 24 into position to again engage the stop 23 when the mutilated gear 22 has completed its revolution. As the gear 22 rotates, after it has passed its first half revolution, the pin 26 comes in contact with the arm 25 and moves it out of the path of travel of the pin 26, the spring 29 exerting its pressure meanwhile to hold the arm 25 in contact with the pin 26 and as soon as the last tooth on the mutilated gear passes out of engagement with the pinion 14, which is just before the stop 23 comes in contact with the pin 24, the arm 25, by its engagement with the crank pin 26, completes the revolution and brings the stop 23 against the pin 24, to hold the mutilated gear in its neutral position until the next operation.

To permit a ready inspection of the operation of the machine, any suitable sliding cover 35 may be provided over an opening in the upper part of the measuring receptacle.

When the unloading mechanism is started, and the arm 25 moves the mutilated gear to bring it into mesh with the pinion 14, if the tooth on the mutilated gear comes in contact with the end of the tooth on the pinion the bearing 8 moves downward to permit the pinion to turn and establish proper meshing relation with the mutilated gear 22 whereupon the spring 34 and the lever 33 act to move the bearing 8 upward to its proper position so that the proper operation between the pinion and the gear is established.

It will be noted that I have produced a device which is exceedingly simple in its mechanical construction and arrangement and one which insures a complete loading of the measuring receptacle at each operation.

It is further to be noted that at the time of unloading, any pressure within the receptacle assists in the unloading operation as the parts move away from the pressure and do not have to overcome it, thereby preventing any possibility of bridging of the grain which would result in false measurements.

By arranging the receiving and measuring portions as above described I am enabled to save considerable length in the ordinary elevators by reason of the fact that my machine does not require any great distance below the discharge point from the elevator.

Having thus fully described my invention, I claim:

1. In a grain measuring device the combination of a measuring receptacle, a receiving portion for delivering grain to the measuring receptacle at the lower part thereof, means within the receiving portion for moving the grain into the measuring receptacle to fill the latter, and means controlled by the grain moving means for unloading the measuring receptacle when it has been filled.

2. In a grain measuring device the combination of a measuring receptacle having a pair of hinged doors forming the lower portion of the receptacle, a receiving portion adjacent the measuring receptacle, a conveyor in the receiving portion for moving grain to the measuring receptacle and for packing it therein to fill the latter, a yielding mounting for the conveyor whereby the packing of the grain will move the conveyor, mechanism for opening and closing the doors forming the lower portion of the measuring receptacle, means for holding the mechanism inoperative until the conveyor has filled the measuring receptacle and has moved its movable mounting, means for setting the mechanism in motion when the measuring receptacle has been filled and the conveyor moves its movable mounting, and driving connections for the conveyor and the mechanism for opening and closing the doors.

3. In a grain measuring device the combination of a measuring receptacle, a receiving portion adjacent the measuring receptacle, a shaft through the measuring receptacle and the receiving portion and carrying a flight conveyor within the receiving portion, a pinion carried by the shaft and adjacent the measuring receptacle, a mounting for the shaft and including means whereby said shaft may be moved endwise by pressure upon the flight conveyor when the measuring receptacle has been filled, means for driving the shaft, a gear adjacent the pinion, said receptacle having a movable closure for the lower portion thereof, a connection between the closure and the gear, and means controlled by the endwise movement of the shaft for establishing connections between the gear and the pinion to rotate the gear and open the closure to unload the receptacle and then close the closure for the next operation.

4. In a grain measuring device the combination of a measuring receptacle, a receiving portion, a shaft extending through the measuring receptacle and the receiving portion, means for driving the shaft, a conveyor on the shaft and in the receiving portion to move the grain into the measuring portion and pack it therein sufficiently to fill the latter, a mounting for the shaft and permitting longitudinal movement thereof when the measuring receptacle has been filled, the lower portion of the measuring receptacle being formed by a hinged closure, a pinion carried by the shaft, a mutilated gear adjacent the pinion, a connection between the mutilated gear and the hinged closure whereby when the gear makes one revolution the hinged closure will be opened and then closed, and means holding the mutilated gear in neutral position and comprising in part a stop which is withdrawn by the longitudinal movement of the shaft said means also comprising in part means for partially rotating the mutilated gear upon the withdrawal of the stop to cause its engagement with the pinion to unload the measuring receptacle.

5. In a grain measuring device the combination of a measuring receptacle, a receiving portion, a shaft passing through the measuring receptacle and the receiving portion, a spiral flight conveyor carried by the shaft and located within the receiving portion, a bearing for the shaft and mounted to permit a yielding longitudinal movement and a yielding transverse movement of the shaft, springs for holding the bearing in normal position, a pinion on the shaft and adjacent the bearing, the lower portion of the measuring receptacle being formed by a pair of hinged closures, a mutilated gear mounted adjacent the pinion, yielding connecting rods from the gear to the hinged closures, a spring operated member normally tending to rotate the gear past its neutral point, and a stop carried by the bearing and cooperating with the gear to hold it in its neutral position whereby when the measuring receptacle has been filled and the pressure therein moves the flight conveyor and its shaft longitudinally the stop carried by the bearing will be withdrawn to permit the spring operated member to move the gear into engagement with the pinion and whereby in event of a clashing of the teeth between the pinion and the gear the yielding mounting will yield to permit the pinion to turn to proper meshing position.

6. In a grain measuring device the combination of a measuring receptacle having a hinged closure forming the lower portion of the receptacle, a receiving portion adjacent the measuring receptacle, a conveyor in the receiving portion for moving grain to the measuring receptacle and for packing it therein to fill the latter, a yielding mounting for the conveyor whereby the packing of the grain in the measuring receptacle will move the conveyor, mechanism for opening and closing the hinged closure, means for holding the mechanism inoperative until the conveyor has filled the measuring receptacle and has moved its yielding mounting, and means controlled by the movement of the yielding mounting for setting the mechanism in motion to first open the hinged closure for the measuring receptacle and then close the latter.

JAMES R. HARRISON.